United States Patent
Choi et al.

(10) Patent No.: US 10,680,221 B2
(45) Date of Patent: Jun. 9, 2020

(54) VENTING SYSTEM OF POUCH TYPE LITHIUM SECONDARY BATTERY

(71) Applicant: SK INNOVATION CO., LTD., Seoul (KR)

(72) Inventors: Ju-Young Choi, Daejeon (KR); Kwan-Yong Kim, Daejeon (KR); Jin-Go Kim, Daejeon (KR); Suk-Hwan Yoon, Gyeongsangbuk-do (KR)

(73) Assignee: SK INNOVATION CO., LTD., Seoul (KR)

( * ) Notice: Subject to any disclaimer, the term of this patent is extended or adjusted under 35 U.S.C. 154(b) by 287 days.

(21) Appl. No.: 14/811,492

(22) Filed: Jul. 28, 2015

(65) Prior Publication Data
US 2016/0036024 A1    Feb. 4, 2016

(30) Foreign Application Priority Data
Jul. 29, 2014 (KR) .................. 10-2014-0096436

(51) Int. Cl.
*H01M 2/12* (2006.01)
*H01M 2/02* (2006.01)
*H01M 10/0525* (2010.01)

(52) U.S. Cl.
CPC ........ *H01M 2/1229* (2013.01); *H01M 2/0207* (2013.01); *H01M 10/0525* (2013.01)

(58) Field of Classification Search
CPC .................... H01M 2/1223; H01M 2/1264
See application file for complete search history.

(56) References Cited

U.S. PATENT DOCUMENTS

| | | | | |
|---|---|---|---|---|
| 538,807 A | * | 5/1895 | Hagiuda | B21D 37/205 235/130 TC |
| 5,258,242 A | * | 11/1993 | Dean | H01M 2/1276 429/54 |
| 2001/0046620 A1 | * | 11/2001 | Inoue | H01M 2/1229 429/54 |
| 2011/0262782 A1 | * | 10/2011 | Zhu | H01M 2/1229 429/54 |
| 2012/0196161 A1 | * | 8/2012 | Yang | H01M 2/0212 429/53 |

FOREIGN PATENT DOCUMENTS

| | | |
|---|---|---|
| JP | 2006-179442 | 7/2006 |
| JP | 2010-503150 | 1/2010 |
| KR | 1020130102807 | 9/2013 |
| WO | WO2013/146803 | 10/2013 |

OTHER PUBLICATIONS

Office Action issued by the Japan Intellectual Property Office dated Feb. 5, 2019.
Office Action issued by the Japan Intellectual Property Office dated Sep. 3, 2019.

* cited by examiner

*Primary Examiner* — Alix E Eggerding
(74) *Attorney, Agent, or Firm* — IP & T Group LLP (57) ABSTRACT

Provided is a venting system of a pouch type lithium secondary battery. According to an exemplary embodiment of the present invention, the venting system of a pouch type lithium secondary battery includes a venting device that controls opening and closing of a passage communicating an internal pressure of a pouch to discharge gas from an inner portion of the pouch.

3 Claims, 9 Drawing Sheets

VENTING SYSTEM OF POUCH TYPE LITHIUM SECONDARY BATTERY

CROSS REFERENCE TO RELATED APPLICATION

This application claims the benefit of Korean Patent Application No. 10-2014-0096436, filed on Jul. 29, 2014, entitled "VENTING SYSTEM OF POUCH TYPE LITHIUM SECONDARY BATTERY", which is hereby incorporated by reference in its entirety into this application.

BACKGROUND ART

A secondary battery refers to a battery capable of being charged and discharged, unlike a primary battery which is not possible to be charged. As an example, a low capacity battery in which one battery cell is packaged in a pack form has been mainly used in small portable electronic devices such as a portable terminal, a note book, a computer, and a camcorder. As another example, a large capacity secondary battery in which a plurality of battery cells are connected in series or in parallel has been used in devices requiring high power, for example, power supply for driving motor of an electric vehicle, and the like.

The secondary battery is possible to be manufactured in various shapes. As representative examples, the secondary battery is manufactured in a pouch-shape, a cylindrical shape, and a prismatic shape, and the like. Among them, the pouch type secondary battery is relatively free in view of a shape, and has a light weight, to be widely used in portable electronic devices requiring slimness and lightweight in recent years.

Figure 1:
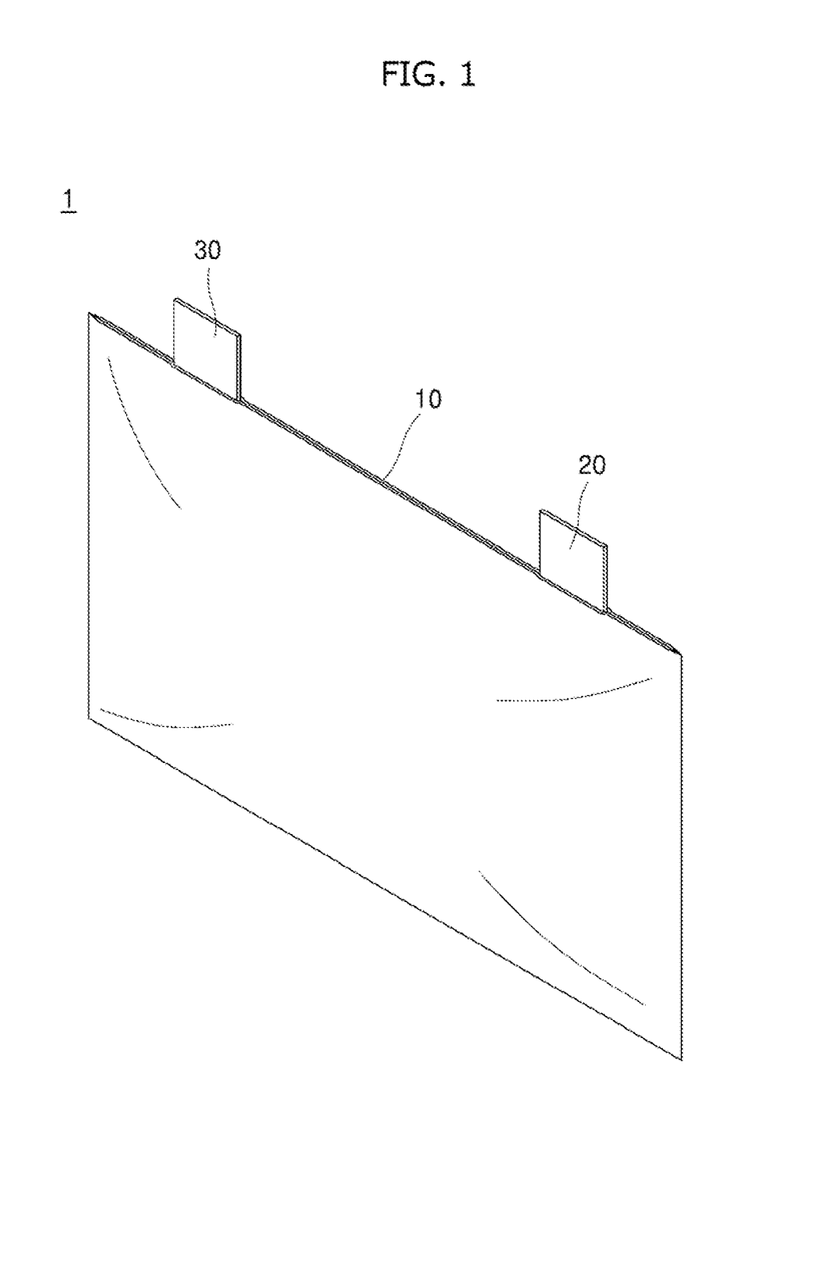
FIG. 1 is a perspective view schematically showing a general pouch type lithium secondary battery.

FIG. 1 is a perspective view schematically showing a general pouch type lithium secondary battery.

Referring to FIG. 1, the general pouch type lithium secondary battery (1) is provided with a pouch packing material (hereinafter, referred to as a "pouch" 10) that is sealed along an edge. The pouch 10 includes a thin metal film and insulating films attached on both surfaces thereof to be freely bendable.

In addition, electrode laminates (not shown) are embedded in the pouch 10, and in order to embed the electrode laminates in the pouch 10, a predetermined space part for accommodating the electrode laminates may be formed in an inner portion of the pouch 10.

Meanwhile, a pair of electrode tabs 20 and 30 protrude toward an outer portion of the pouch 10, and these electrode tabs 20 and 30 may be electrically connected to the electrode laminates embedded in the pouch 10.

However, in the case of the pouch type lithium secondary battery, a passage with an outer portion is completely blocked at the end stage of manufacturing the battery, in order to prevent introduction of water and air.

However, this blocking structure may be a factor that prevents discharge of gas generated by deterioration in view of characteristics of the lithium secondary battery.

That is, when gas generated in the inner portion of the pouch is not smoothly discharged, but increased in a predetermined amount or more, appearance deformation of the pouch may be caused. Due to the deformation, internal electrode laminates are out of an initially arranged state and disorderly arranged. As a result, short-circuit may occur and even the short-circuit may become a cause of smoke or ignition.

Korean Patent Laid-Open Publication No. 10-2013-0102807 (Publication Date: Sep. 23, 2013) which is a relevant prior art discloses a lithium polymer secondary battery.

DISCLOSURE

Technical Problem

An aspect of the present invention is to provide a venting system of a pouch type lithium secondary battery capable of actively discharging gas depending on a change in cell internal pressure of a pouch.

In addition, another aspect of the present invention is to provide a venting system of a pouch type lithium secondary battery capable of securing stability of the pouch type lithium secondary battery by suppressing deformation of the pouch due to generation of internal gas.

However, technical problems to be achieved in the present invention are not limited to the above-mentioned problems, and other problems will be clearly understood to those skilled in the art from the following descriptions.

Technical Solution

In accordance with one aspect of the present invention, a venting system of a pouch type lithium secondary battery includes: a venting device that controls opening and closing of a passage communicating an internal pressure of a pouch to discharge gas from an inner portion of the pouch.

At least one venting device may be included in a sealing part of the pouch.

At least one venting device may be included in a sealing part of the pouch, and may be provided in a direction of electrode tabs.

The venting device may include: a wing-shaped body part having a hollow part communicating an inner portion of the pouch with an outer portion of the pouch, and inserted into the pouch to attach both surfaces of the body part to the pouch; and a gas discharge controlling part equipped in a passage communicated with the hollow part of the body part, and opening and closing the passage depending on a change in an internal pressure of the pouch.

The gas discharge controlling part may include a locking member opening and closing the passage; and an elastic member coupled to a shaft of the locking member to provide elastic force of the locking member.

A reference pressure which is a basis for a venting operation depending on selection of a coefficient of elasticity of the elastic member may be determined, when the internal pressure of the pouch is smaller than the reference pressure, the locking member may close the passage by elastic force provided from the elastic member, and meanwhile, when the internal pressure of the pouch is larger than the reference pressure, the elastic member may be contracted to allow the locking member to open the passage.

The locking member may have a hemispherical body, and the passage contacting the locking member may be provided with an annular sealing member corresponding to the locking member.

An extended end part protruding from the body part may be formed at an outer side of the passage connected to the hollow part of the body part.

An outer side of the extended end part may be provided with a finishing member formed so as to block the passage, and the finishing member may allow the elastic member to be inserted into an inner portion of the passage to prevent separation of the elastic member.

The finishing member may be provided with a through hole communicating the internal pressure of the pouch so that the shaft of the locking member freely moves.

The through hole of the finishing member may have a larger diameter than a diameter of the shaft of the locking member to form a flow passage that discharges gas through a gap between the shaft of the locking member and the through hole of the finishing member.

Advantageous Effects

According to the present invention, gas may be actively discharged depending on a change in cell internal pressure of a pouch.

In addition, deformation of the pouch due to generation of internal gas may be suppressed to secure stability of a pouch type lithium secondary battery.

Further, a reference pressure which is a basis for a venting operation depending on selection of a coefficient of elasticity of an elastic member may be determined.

For example, when the internal pressure of the pouch is smaller than the reference pressure, a locking member may close a passage by elastic force provided from the elastic member.

In addition, when the internal pressure of the pouch is larger than the reference pressure, the elastic member may be contracted to allow the locking member to open the passage.

BEST MODE

Advantages and features of the present invention and methods to achieve them will be elucidated from exemplary embodiments described below in detail with reference to the accompanying drawings. However, the present invention is not limited to the exemplary embodiments disclosed herein but will be implemented in various forms. The exemplary embodiments are provided by way of example only so that a person of ordinary skill in the art can fully understand the disclosures of the present invention and the scope of the present invention. Therefore, the present invention will be defined only by the scope of the appended claims. The same reference numerals refer to the same components throughout the specification.

In addition, in describing the exemplary embodiments of the present invention, detailed descriptions of well-known functions or constructions are omitted so as not to obscure the description of the present invention with unnecessary detail. Further, the following terminologies are defined in consideration of the functions in the present invention and may vary in different ways by the intention of users and operators. Therefore, the definitions thereof should be construed based on the contents throughout the specification.

Hereinafter, a venting system of a pouch type lithium secondary battery according to exemplary embodiments of the present invention will be described in detail with reference to the accompanying drawings.

Figure 2:
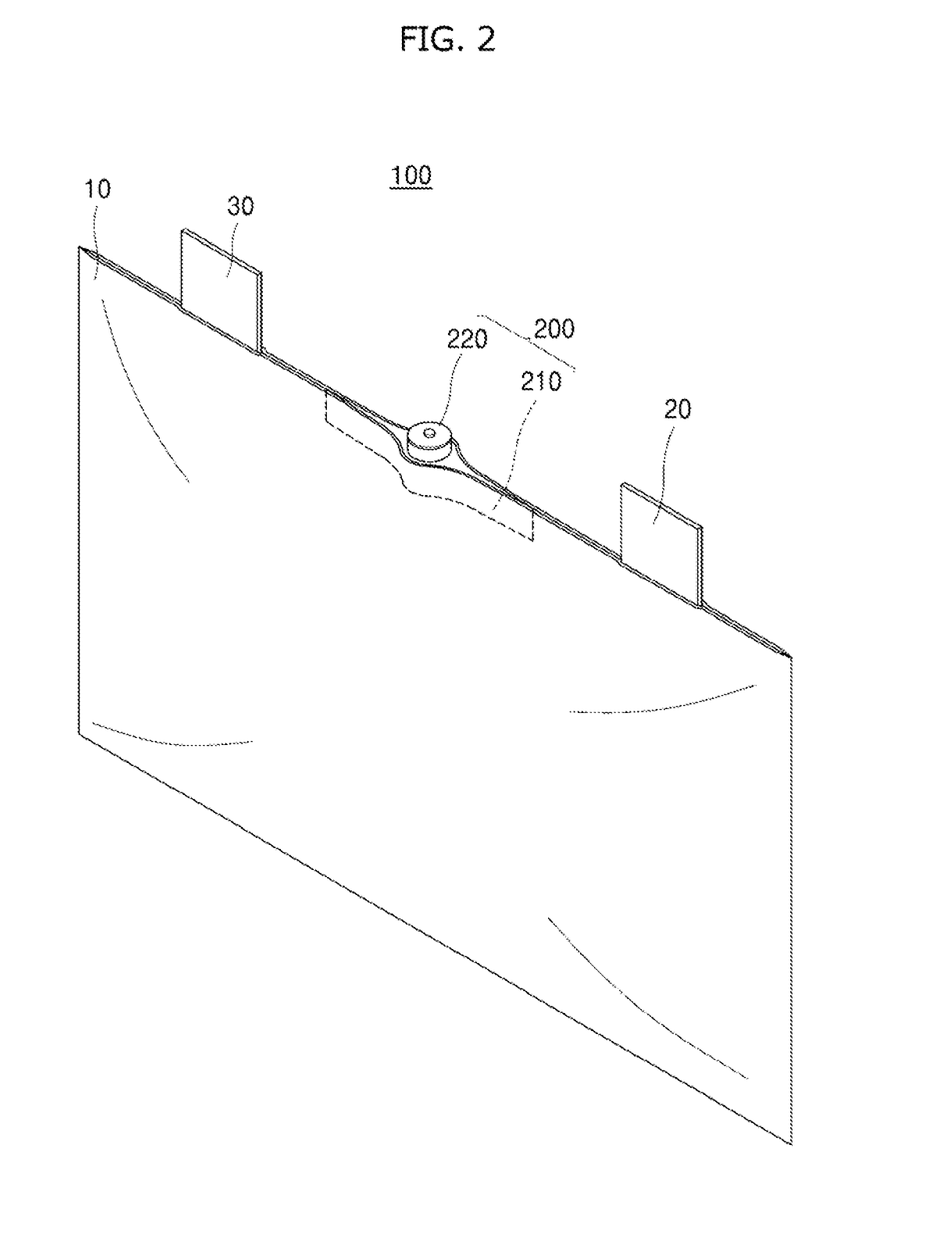
FIG. 2 is a perspective view schematically showing a venting system of a pouch type lithium secondary battery according to an exemplary embodiment of the present invention.

FIG. 2 is a perspective view schematically showing a venting system of a pouch type lithium secondary battery according to an exemplary embodiment of the present invention.

Referring to FIG. 2, the venting system of a pouch type lithium secondary battery includes a venting device 200.

The venting device 200 may control opening and closing of a passage communicating an internal pressure of a pouch 10 to discharge gas from an inner portion of the pouch 10.

At least one venting device 200 may be included in a sealing part 11 of the pouch 10, and preferably, may be provided in a direction of electrode tabs 20 and 30. However, the shape of the venting device 200 is not necessarily limited thereto.

Meanwhile, the pouch type lithium secondary battery 100 may include a pouch 10 sealed along an edge, electrode laminates (not shown) embedded in the pouch 10, and at least one pair of electrode tabs 20 and 30 protruding toward an outer portion of the pouch 10.

The pouch 10 may include a thin metal film and insulating films attached on both surfaces thereof. In addition, the electrode laminates may be embedded in the pouch 10. Although specific shapes of the electrode laminates are not separately shown, the electrode laminate is not limited in view of a shape. The electrode tabs 20 and 30 may be electrically connected to the electrode laminates embedded in an inner accommodation area of the pouch 10, and may protrude toward the outer portion of the pouch 10.

The venting device 200 provided in the sealing part of the pouch type lithium secondary battery 100 configured as above may include a body part 210 and a gas discharge controlling part 220 as shown in FIG. 2.

The body part 210 means a wing-shaped member having a hollow part communicating an inner portion of the pouch 10 with an outer portion of the pouch 10, and inserted into the sealing part of the pouch to attach both surfaces of the body part to the sealing part of the pouch.

The reason that the body part 210 has a wing shape in which a thickness becomes thinner toward both sides is because the body part 210 is smoothly inserted into a sealing part of the pouch 10 to facilitate binding of both surfaces of the body part.

The gas discharge controlling part 220 is equipped in a passage communicated with the hollow part of the body part 210, and has a function of opening and closing the passage depending on a change in an internal pressure of the pouch to actively discharge gas.

Figure 3:
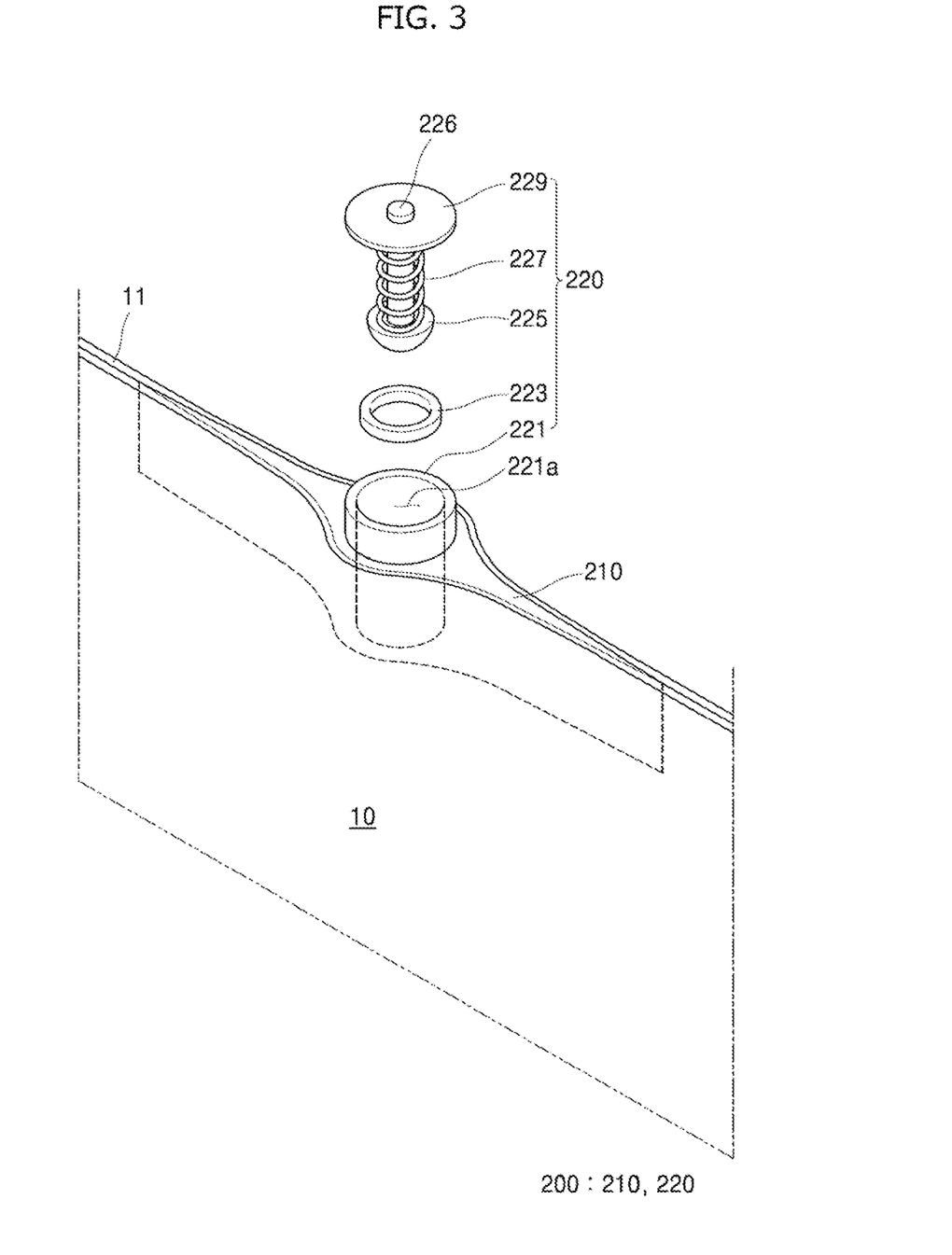
FIG. 3 is an exploded perspective view showing detailed components of a venting device according to an exemplary embodiment of the present disclosure.
Figure 4:
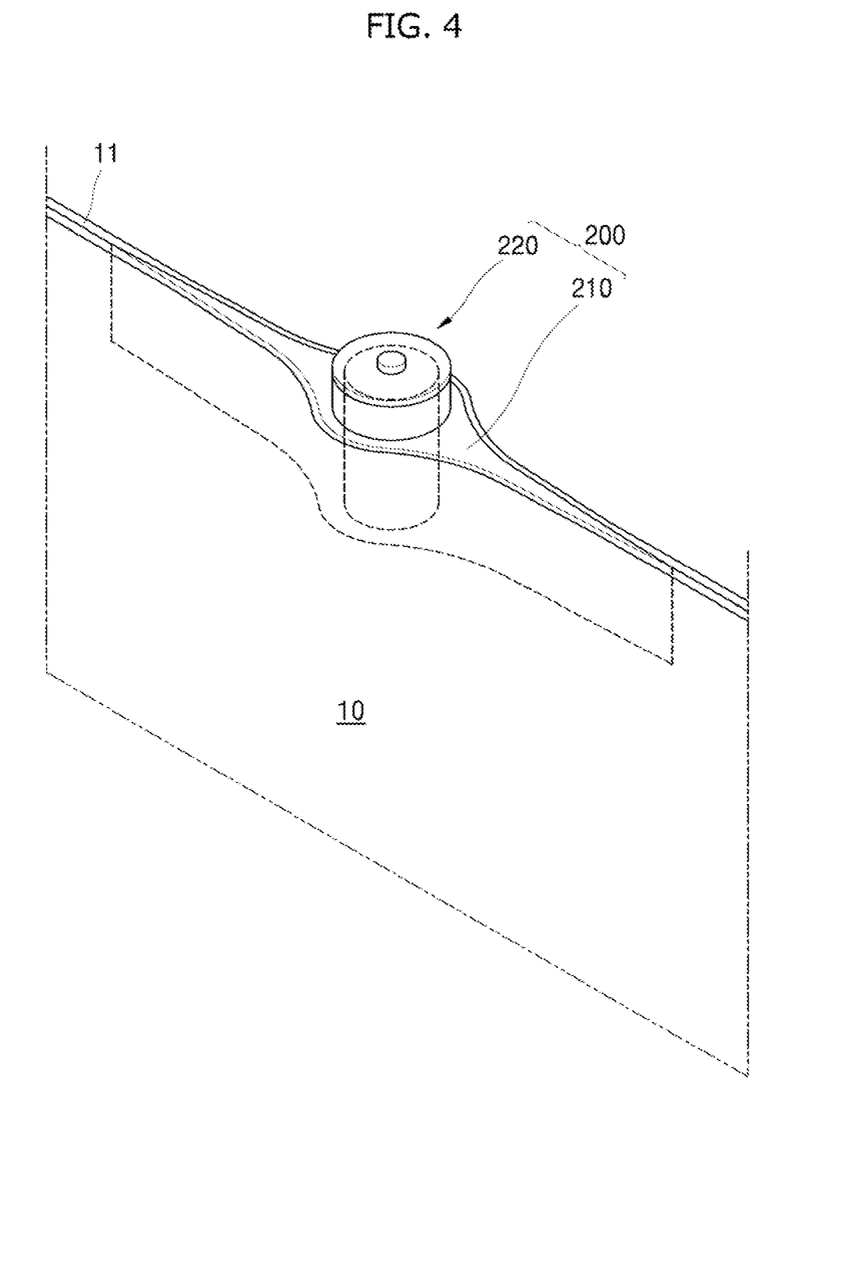
FIG. 4 is an assembly perspective view of the venting device according to an exemplary embodiment of the present invention.

FIG. 3 is an exploded perspective view showing detailed components of a venting device according to an exemplary embodiment of the present disclosure, and FIG. 4 is an assembly perspective view of the venting device according to an exemplary embodiment of the present invention.

Referring to FIG. 3, the venting device 200 may include: the body part 210 and the gas discharge controlling part 220.

The body part 210 may be inserted into the sealing part 11 of the pouch 10 to attach both surfaces thereof to the sealing part of the pouch 10, such that the body part 210 may secure a structure in which all of other remaining surfaces except for the venting device 200 are sealed.

The gas discharge controlling part 220 may be equipped in a passage 221a communicated with the hollow part of the body part 210. In addition, the gas discharge controlling part may open and close the passage 221a depending on a change in an internal pressure of the pouch 10 so as to actively discharge gas generated from the inner portion of the pouch 10.

To this end, the gas discharge controlling part 220 may include: a locking member 225 opening and closing the passage 221a; and an elastic member 227 coupled to a shaft 226 of the locking member to provide predetermined elastic force to the locking member 225.

Further, a reference pressure which is a basis for a venting operation depending on selection of a coefficient of elasticity of the elastic member 227 may be determined. Description regarding this is provided below with reference to FIGS. 5 and 6.

As a preferable example, the locking member 225 may have a hemispherical body. Meanwhile, the present invention is not necessarily limited to the above-described shape. In addition, the passage 221a contacting the locking member 225 may be further provided with an O ring, that is, an annular sealing member 223.

Accordingly, when the internal pressure of the pouch 10 is smaller than the reference pressure, the locking member 225 may contact and apply pressure to the annular sealing member 223 by elastic force provided from the elastic member 227 to close the passage 221a.

On the contrary, when the internal pressure of the pouch 10 is larger than the reference pressure, the elastic member 227 is contracted, such that the locking member 225 may be separated from the annular sealing member 223 to open the passage 221a.

Meanwhile, an extended end part 221 protruding from the body part 210 may be formed at an outer side of the passage 221a. Meanwhile, the present invention is not necessarily limited to the above-described shape.

In addition, an open part of the extended end part 221 may be provided with a finishing member 229 that blocks the passage.

The finishing member 229 may allow the elastic member 227 coupled to a shaft 226 of the locking member 225 to be inserted into an inner portion of the passage 221a to serve to fix a position of the elastic member 227.

In addition, the center of the finishing member 229 may be provided with a through hole. The through hole is communicated with a change in the internal pressure of the pouch 10 to provide a space in which the shaft 226 of the locking member freely moves when the locking member 225 moves forwardly and reversely.

In addition, the through hole of the finishing member preferably has a larger diameter than a diameter of the shaft 226 of the locking member so as to have a predetermined gap between the shaft 226 of the locking member and the through hole of the finishing member. Here, the gap formed between the shaft 226 of the locking member and the through hole of the finishing member may be used as a flow passage that discharges gas to the outer portion of the pouch 10.

In addition, referring to FIG. 4, a shape in which detailed components of the above-described venting device 200 are assembled may be confirmed.

Next, an operation relationship of the venting system of the pouch type lithium secondary battery of the present invention including the above-described detailed components will be described.

Figure 5:
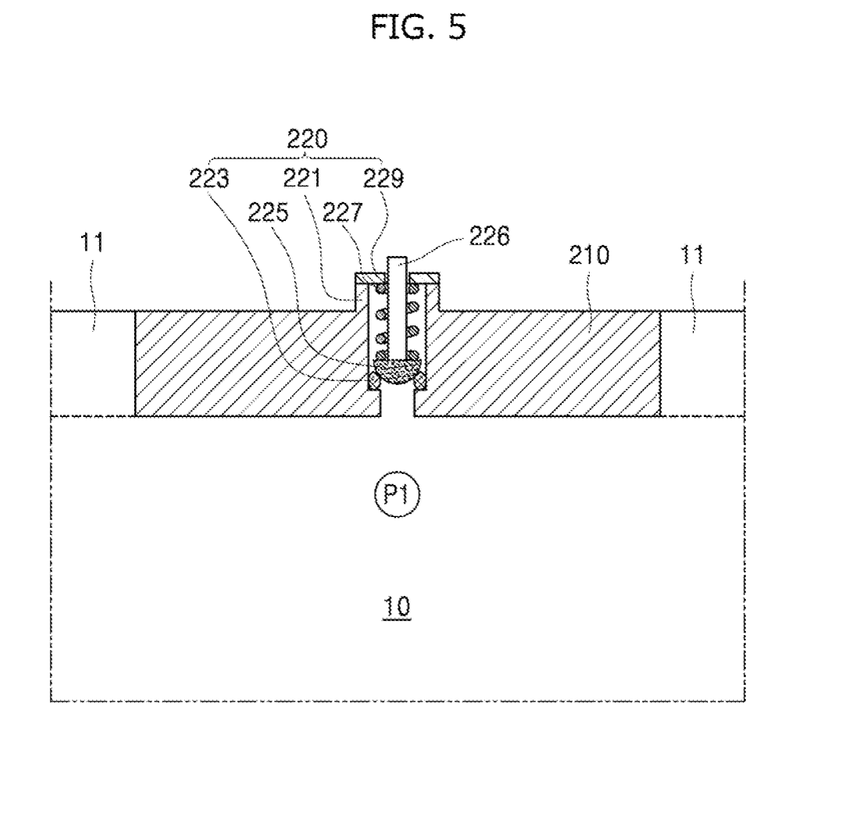
FIGS. 5 and 6 are operation views showing a venting system of the pouch type lithium secondary battery according to an exemplary embodiment of the present invention before and after being operated.

FIG. 5 is an operation view showing a state before a venting operation, that is, a gas discharging operation, of the venting system of the pouch type lithium secondary battery according to an exemplary embodiment of the present invention, is performed, and FIG. 5 is an operation view showing a state in which the venting operation is generated.

Figure 6:
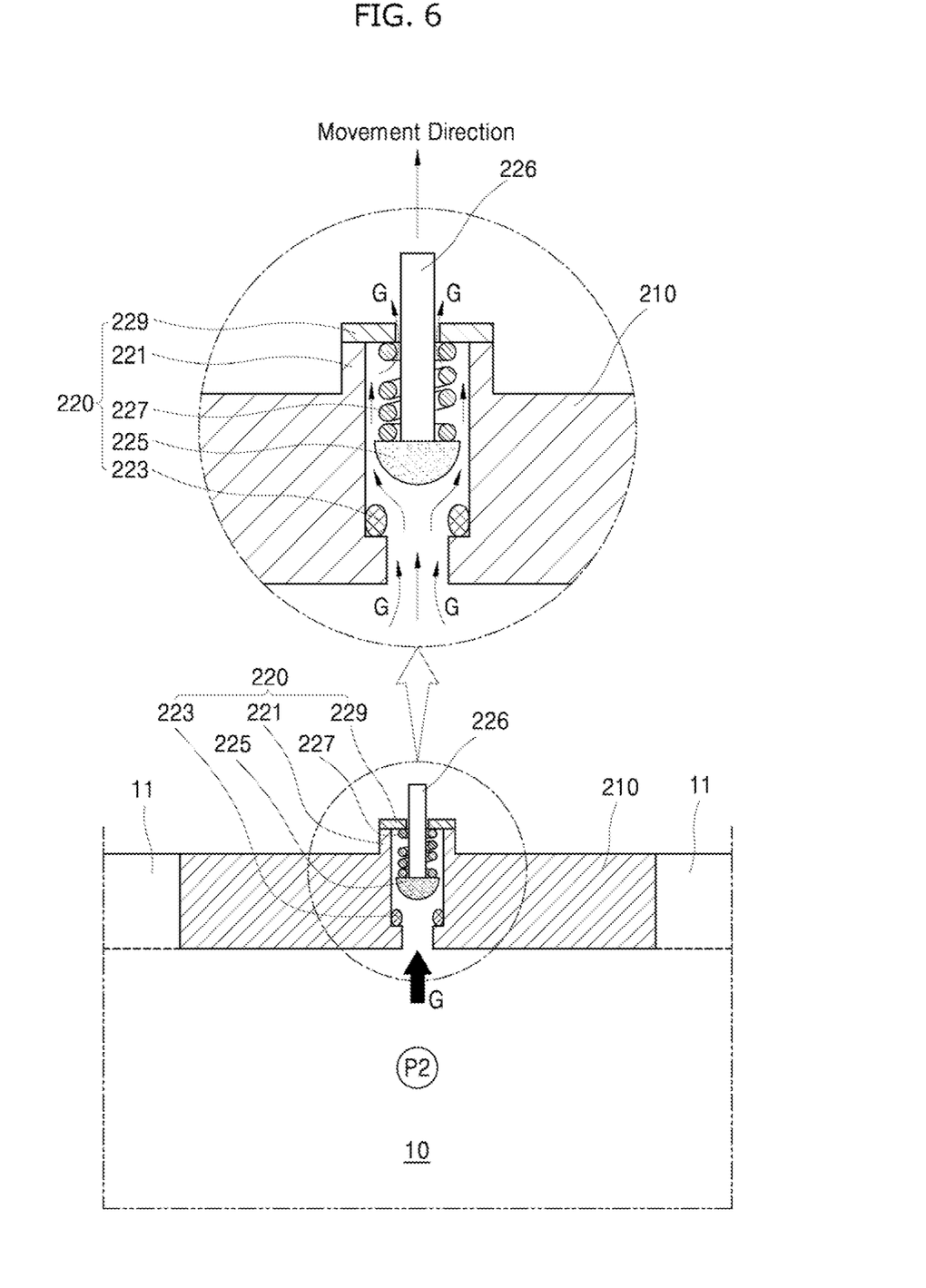

Referring to FIGS. 5 and 6, both surface of the body part 210 may be attached to the sealing part of the pouch, and the center of the body part 210 may be formed with the gas discharge controlling part 220.

The gas discharge controlling part 220 may be provided along a passage communicated with the hollow part of the body part 210, and may include the above-described annular sealing member 223, the locking part 225, the elastic member 227, and the finishing member 229.

Preferably, coefficient of elasticity of the elastic member 227 may be selected differently depending on a venting pressure desired by the user, that is, the reference pressure which is a basis for a venting operation.

In FIG. 5, when the internal pressure of the pouch is P1, this P1 is less than the reference pressure, such that the venting operation is not generated.

On the contrary, when the internal pressure of the pouch is P2, this P2 reaches or more than the reference pressure, such that the venting operation may be generated.

That is, only when the internal pressure of the pouch reach the reference pressure, the elastic member 227 may be contracted, and the locking member 225 may be separated from the annular sealing member 223 contacting the locking member 225, such that gas G generated in the inner portion of the pouch 10 may be discharged along the communicated passage to the outside.

The gas G discharged to the passage through the opening of the locking member 225 may be discharged through the gap formed between the shaft 226 of the locking member and the through hole of the finishing member 229 to the outside.

In addition, as the gas G generated in the inner portion of the pouch 10 is discharged to the outside, the internal pressure of the pouch 10 may be less than the reference pressure again. Accordingly, the elastic member 227 is elongated and restored to the initial state, and the locking member 225 may contact and apply pressure to the annular sealing member 223 to close the passage.

Meanwhile, a shape of the body part 210 may be variously changed, which will be described with reference to FIGS. 7 to 9c.

Figure 7:
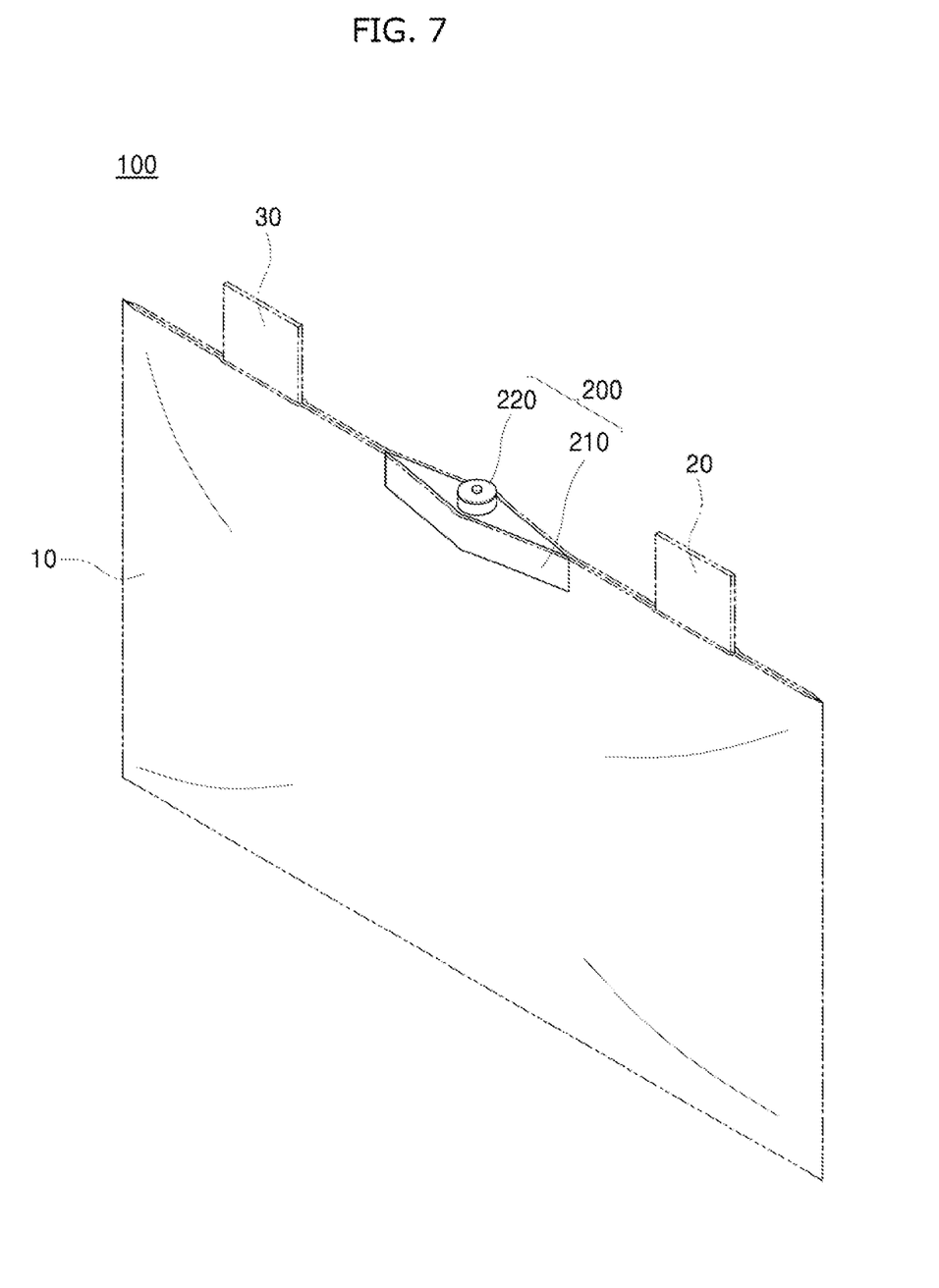
FIGS. 7, 8, 9a, 9b and 9c show various exemplary shapes of a body part of the venting system of the pouch type lithium secondary battery according to an exemplary embodiment of the present invention.

Referring to FIG. 7, the body part 210 shown in FIG. 7 has a cross-sectional shape in which a thickness becomes narrower obliquely toward both side ends, that is, a cross-sectional shape similar to rhombus, which is unlike the above-description.

Figure 8:
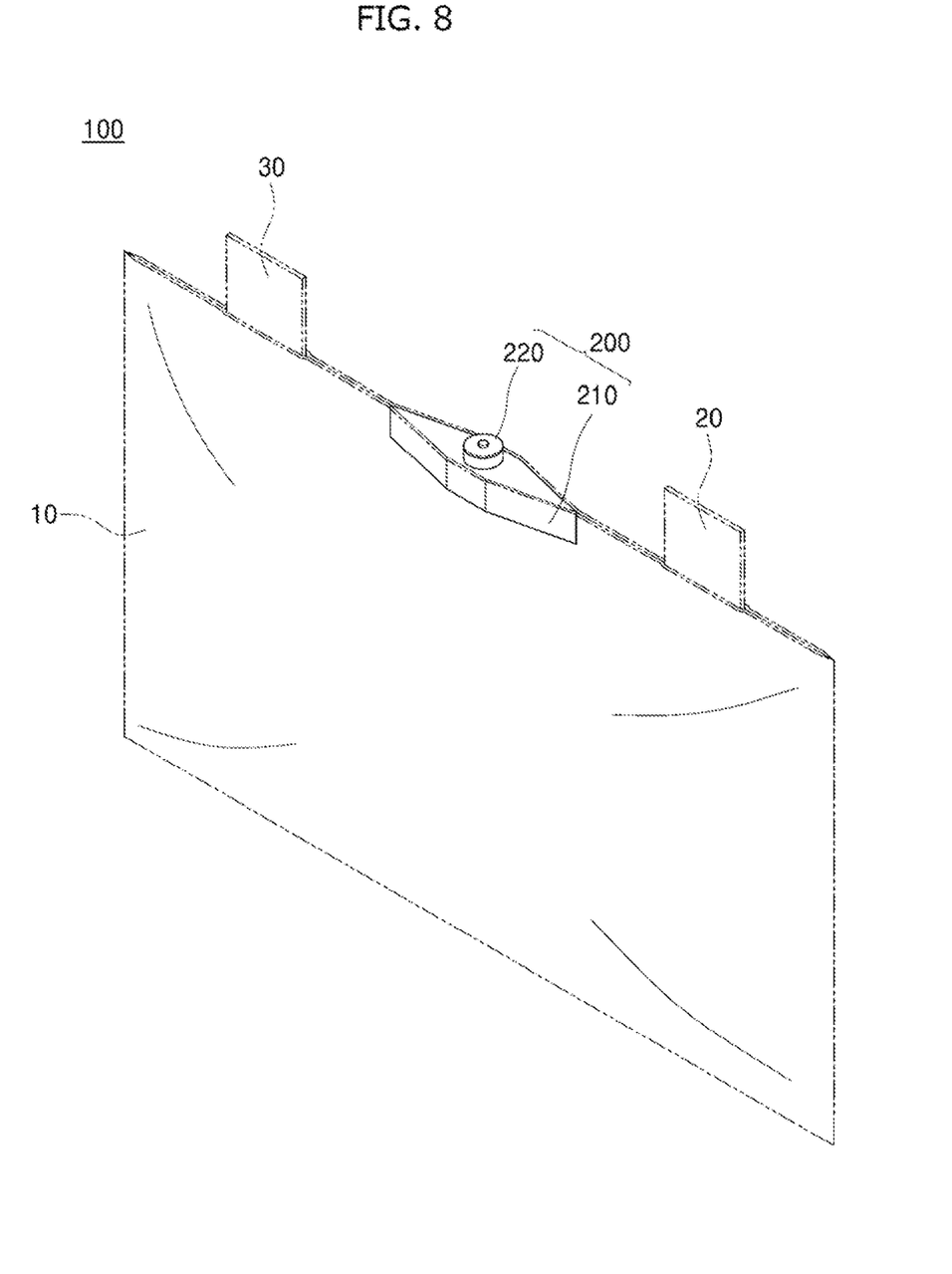

Next, referring to FIG. 8, it may be confirmed that the center part of the shown body part 210 may have a square cross-sectional shape, and a cross-sectional shape in which a thickness becomes narrower obliquely toward both side ends.

Figure 9A:
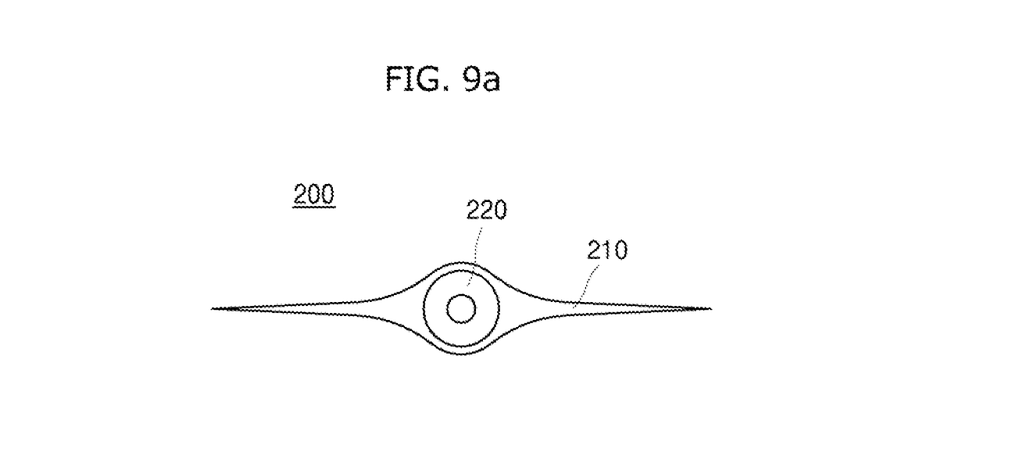
Figure 9B:
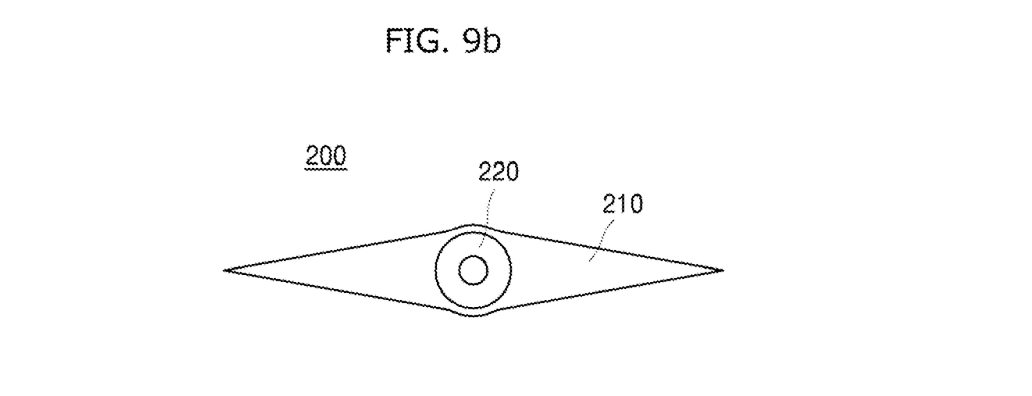
Figure 9C:
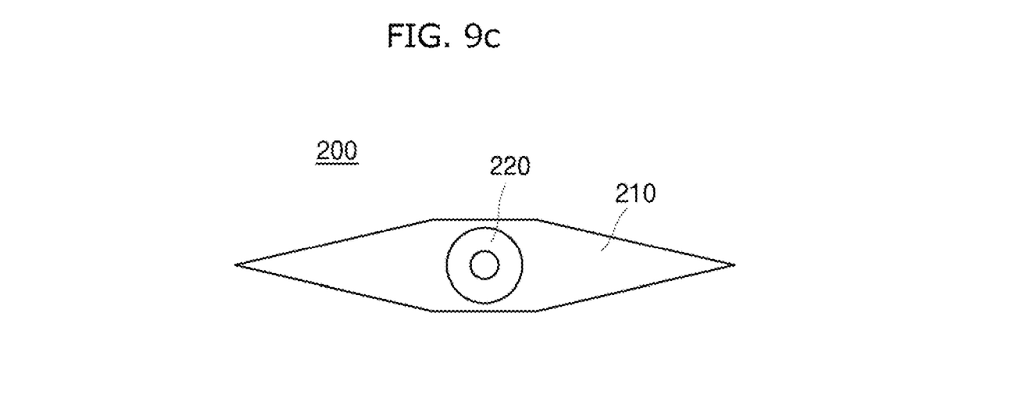

FIGS. 9a, 9b and 9c is a cross-sectional view showing three preferable exemplary shapes of the body part. Referring to FIG. 9a, the center of the body part 210 is formed in a circular cross section, and the body part 210 has a cross-sectional shape in which a thickness becomes thinner toward both side ends while being rounded. Referring to FIG. 9b, the center of the body part 210 is formed in a circular cross section, and the body part has a rhombus-like cross-sectional shape in which a thickness becomes thinner obliquely toward both side ends. Next, referring to FIG. 9c, the center of the body part 210 is formed in a square cross section, and the body part has a shape in which a thickness becomes thinner obliquely toward both side ends. In addition to this, although not separately shown, the body part 210 may be provided in various shapes.

As described above, according to the configuration and the function of the present invention, gas may be actively discharged depending on a change in cell internal pressure of the pouch.

In addition, deformation of the pouch due to generation of internal gas may be suppressed to secure stability of the pouch type lithium secondary battery.

Further, a reference pressure which is a basis for a venting operation depending on selection of a coefficient of elasticity of an elastic member may be determined.

For example, when the internal pressure of the pouch is smaller than the reference pressure, a locking member may close a passage by elastic force provided from the elastic member.

In addition, when the internal pressure of the pouch is larger than the reference pressure, the elastic member may be contracted to allow the locking member to open the passage.

Further, elastic modulus of the elastic member may be appropriately selected depending on the reference pressure desired by the user, such that it is possible to implement the venting operation of the pouch type lithium secondary battery under various pressure conditions.

In addition, disturbance occurring at the time of assembling a secondary battery module or a pack inserted through a side surface may be reduced, malfunctions may be remarkably reduced by using relatively simple mechanical configuration, and it is possible to allow all products to discharge gas under uniform pressure.

Hereinabove, although the venting system of the pouch type lithium secondary battery has been described, it is obvious to those skilled in the art that various modifications, alterations, and changes may be made without departing from the scope of the present invention.

It should be construed that the above-described exemplary embodiments of the present invention have been disclosed for illustrative purposes, and the present invention is not limited thereto. In addition, it should be interpreted that the scope of the present invention is defined by the following claims rather than the above-mentioned detailed description, and all modifications or alterations deduced from the meaning, the scope, and equivalences of the claims are included in the scope of the present invention.

DETAILED DESCRIPTION OF MAIN ELEMENTS

G: Gas
10: Pouch (or Pouch packing material)
11: Sealing part
20, 30: Electrode tab
100: Pouch type lithium secondary battery
200: Venting device
210: Body part
220: Gas discharge controlling part
221: Extended end part
221a: Passage
223: Annular sealing member
225: Locking member
226: Shaft of locking member (or shaft)
227: Elastic member
229: Finishing member

The invention claimed is:

1. A venting system of a pouch type lithium secondary battery, comprising:
   a venting device for discharging gas from an inner portion of the pouch,
   the venting device including:
      a body part inserted into the pouch with two side surfaces of the body part being sealingly attached to the pouch, the body part having a hollow part allowing fluid communication of the inner portion of the pouch with an outer portion of the pouch;
      a gas discharge controlling part equipped with a passage in fluid communication with the hollow part of the body part;
      the gas discharge controlling part including a locking member attached to a shaft and an elastic member coupled to the shaft to provide an elastic force to the locking member for opening and closing the passage depending on a change in an internal pressure of the pouch;
   wherein an extended end part protruding from the body part is formed at an outer side of the passage connected to the hollow part of the body part,
   wherein an outer side of the extended end part is provided with a finishing member formed so as to block the passage, and the finishing member allows the elastic member to be inserted into an inner portion of the passage to prevent separation of the elastic member,
   wherein the finishing member is provided with a through hole,
   wherein the through hole of the finishing member is communicated with a change in the internal pressure of the pouch to provide a space in which the shaft of the locking member freely moves when the locking member moves forwardly and reversely,
   wherein the through hole of the finishing member has a larger diameter than a diameter of the shaft of the locking member to form a flow passage that discharges gas through a gap between the shaft of the locking member and the through hole of the finishing member,
   wherein the end of the shaft of the locking member always passes through the through hole and protrudes from the outer portion of the finishing member,
   wherein the locking member has a hemispherical body, and the passage contacting the locking member is provided with an annular sealing member corresponding to the locking member,
   wherein when the internal pressure of the pouch is less than a reference pressure, the locking member closes the passage by elastic force provided from the elastic member,
   wherein when the internal pressure of the pouch is greater than the reference pressure, the elastic member contracts to allow the locking member to open the passage, and wherein the reference pressure is controlled by selecting a coefficient of elasticity for the elastic member corresponding to the reference pressure determined for the venting system.

2. The venting system of a pouch type lithium secondary battery of claim 1, wherein at least one venting device is included in a sealing part of the pouch.

3. The venting system of a pouch type lithium secondary battery of claim 1, wherein at least one venting device is included in a sealing part of the pouch in a direction of a pair of electrode tabs which are attached to the pouch.

* * * * *